US008262186B2

(12) United States Patent
Chappell et al.

(10) Patent No.: US 8,262,186 B2
(45) Date of Patent: Sep. 11, 2012

(54) PRE-LEVELER COOLING DEVICE FOR CONTINUOUS FEED IMAGING DEVICES

(75) Inventors: James Michael Chappell, Webster, NY (US); Jason Matthew LeFevre, Penfield, NY (US); Paul John McConville, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 501 days.

(21) Appl. No.: 12/643,205

(22) Filed: Dec. 21, 2009

(65) Prior Publication Data

US 2011/0148973 A1 Jun. 23, 2011

(51) Int. Cl.

*B41J 29/377* (2006.01)
*B41J 2/175* (2006.01)
*B41J 2/01* (2006.01)
*G01D 11/00* (2006.01)

(52) U.S. Cl. ............... 347/18; 347/88; 347/99; 347/102

(58) Field of Classification Search ..................... 347/18
See application file for complete search history.

(56) References Cited

U.S. PATENT DOCUMENTS

| | | | | |
|---|---|---|---|---|
| 5,805,969 | A | 9/1998 | Elsermans et al. | |
| 6,285,850 | B1 | 9/2001 | Van Weverberg et al. | |
| 6,494,570 | B1 * | 12/2002 | Snyder | 347/103 |
| 2008/0181688 | A1 | 7/2008 | Kurita | |
| 2008/0298831 | A1 | 12/2008 | VanKouwenberg et al. | |

* cited by examiner

*Primary Examiner* — Uyen Chau N Le
*Assistant Examiner* — Kajli Prince
(74) *Attorney, Agent, or Firm* — Maginot, Moore & Beck, LLP

(57) ABSTRACT

A temperature leveling system for thermally conditioning ink deposited onto a print media includes a non-contact cooling device for reducing temperatures of ink deposited onto a print media to a first average temperature. A leveler includes a thermal control for maintaining the leveler at a second temperature that is different than the first average temperature. The leveler is configured to bring the temperatures of the ink to within a predetermined range about the second temperature after the reduction in temperature at the non-contact cooling device. A heater is positioned to heat the ink and media to a third temperature after the leveler, the third temperature being greater than the second temperature.

19 Claims, 3 Drawing Sheets

PRE-LEVELER COOLING DEVICE FOR CONTINUOUS FEED IMAGING DEVICES

TECHNICAL FIELD

The present disclosure relates to ink-jet printing, and, in particular, to ink-jet printing using phase-change inks on a substantially continuous web.

BACKGROUND

In general, ink jet printing machines or printers include at least one printhead that ejects drops or jets of liquid ink onto a recording or image forming media. A phase change ink jet printer employs phase change inks that are in the solid phase at ambient temperature, but transition to a liquid phase at an elevated temperature. The molten ink can then be ejected onto a printing media by a printhead directly onto an image receiving substrate, or indirectly onto an intermediate imaging member before the image is transferred to an image receiving substrate. Once the ejected ink is on the image receiving substrate, the ink droplets quickly solidify to form an image.

In both the direct and offset printing architecture, images may be formed on a continuous media web. In a web printer, a continuous supply of media, typically provided in a media roll, is conveyed by a plurality of rollers that are arranged to guide the media web through a print zone where a plurality of printheads are positioned to deposit ink onto the web to form images. Beyond the print zone, the media web is gripped and pulled by mechanical structures so a portion of the media web continuously moves through the print zone. Tension bars or rollers may be placed in the feed path of the moving web to remove slack from the web so it remains taut without breaking.

In continuous-web direct to paper printing, a fixing assembly is used after the ink is jetted onto the web to fix the ink to the web. The fixing assembly used depends on the type of ink. For example, when using melted phase change ink to form images, the fixing assembly may include a pair of rollers that defines a nip therebetween for applying pressure to the ink and web to spread the ink on the web. The function of the pair of rollers, also referred to herein as a spreader, is to transform a pattern of ink droplets deposited onto a web and spread them out to make a more uniform and continuous layer. The spreader uses pressure and/or heat to reduce the height of the ink droplets and fill the spaces between adjacent drops.

One objective in the operation of the imaging device is to equalize the temperatures of the web and ink layers and to bring them to a target spreading temperature that enables the ink deposited on the web to be spread uniformly in order to achieve a desired image quality prior to entering the spreader nip. If the ink is too hot entering the spreader, the ink may bleed into the web farther than desired and possibly show through on the other side. Conversely, if the ink is too cool, the ink may not be malleable enough to allow for sufficient line spread as well as adherence to the web. In addition, ink may enter the spreader at varying temperatures which may cause inconsistent and non-uniform line spread on the web.

In order to equalize the ink and web temperatures at the target spreading temperature, some previously known systems utilized a two-stage process in which, after exiting the print zone, the web was first wrapped around a temperature leveling roller to equalize, or level, the web and ink temperatures at a temperature lower than the target spreading temperature. The dwell time between the web and the leveler roller enabled conductive heat transference to occur between the web and the leveler roller to bring the temperatures of the ink and web toward the operating temperature of the leveler roller. In the second stage, after leveling the web and ink temperatures with the leveler roller, radiant heat was applied to the web to elevate the leveled ink and web temperatures to the desired spreading temperature for the spreading nip.

One difficulty faced in contacting the ink and web with a leveling roller to equalize ink temperatures for spreading is ink offsetting from the web to the leveler roller surface. Ink offset is a function of the temperature of the incoming ink and the roller surface temperature. To avoid ink offset to the leveler roller, previously known systems operated the leveler roller at a temperature that was lower than would otherwise be sufficient for equalizing the ink temperatures for spreading. The lower the operating temperature for the leveler roller, the greater the amount of energy required by the midheaters to reheat the ink and web to the target spreading temperature. In addition, the leveler roller absorbs heat from the hotter ink and web as part of the equalization process. To maintain the leveler roller at the operating temperature, i.e., to avoid an increase in temperature, the roller is provided with a device or system for cooling or removing heat from the surface of the leveler roller. Therefore, lowering the operating temperature of the leveler roller increases the amount of energy required to maintain the leveler roller at the lower operating temperature.

SUMMARY

To address the problems associated with ink offset to the leveler roller, a leveling system for use with an imaging device has been developed that includes a non-contact cooling device for removing thermal energy from ink deposited on a web of media to reduce a temperature of the deposited ink to a leveling temperature, a leveler roller including a heater for heating the leveler roller to a target temperature, the leveler roller being configured to be partially wrapped by the continuous web after passing the cooling device so that conductive heat transfer occurs between the leveler roller and the ink and web to bring the ink and web to the target temperature, and at least one non-contact heater positioned downstream from the leveler roller to heat the ink and web to a spreading temperature.

In another embodiment, an imaging device is provided that includes a web transport system configured to transport a continuous web of media along a web path having a print zone. At least one printhead is positioned in the print zone adjacent the web path that is configured to deposit ink onto the web to form images thereon. A non-contact cooling device is positioned adjacent the media path downstream from the at least one printhead for removing thermal energy from the ink deposited on the web to reduce a temperature of the deposited ink to a leveling temperature. A leveler roller including a heater for heating the leveler roller to a target temperature is positioned to be partially wrapped by the continuous web after passing the cooling device so that conductive heat transfer occurs between the leveler roller and the ink and web to bring the ink and web to the target temperature. At least one non-contact heater is positioned downstream from the leveler roller to heat the ink and web to a spreading temperature. A spreader is positioned downstream from the print zone and configured to apply pressure to the web and the ink deposited thereon in the print zone.

DETAILED DESCRIPTION

Figure 1:
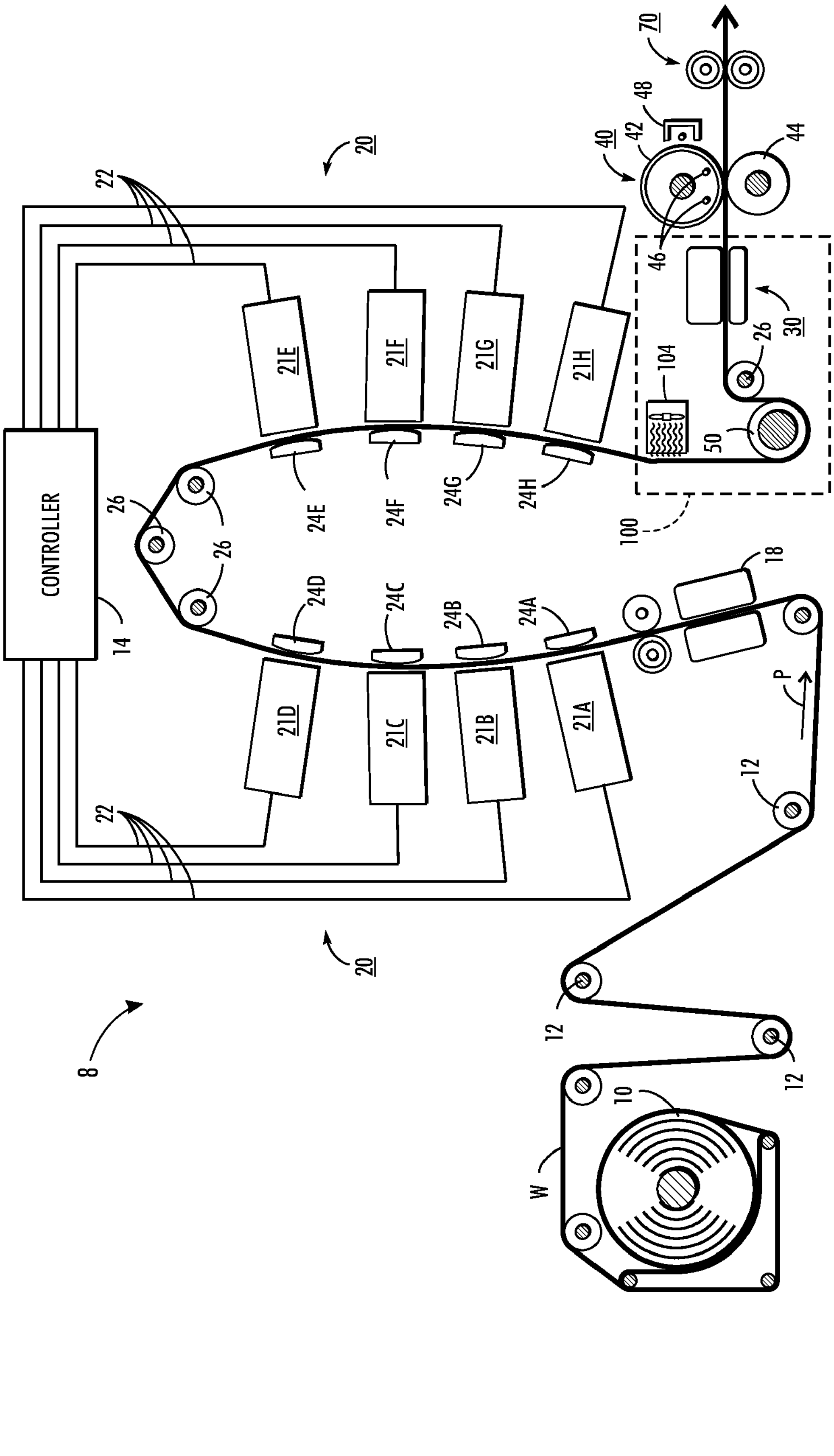
FIG. 1 is a simplified elevational view of a direct-to-sheet, continuous-web, phase-change ink printer.

For a general understanding of the present embodiments, reference is made to the drawings. In the drawings, like reference numerals have been used throughout to designate like elements.

As used herein, the term "imaging device" generally refers to a device for applying an image to print media. "Print media" may be a physical sheet of paper, plastic, or other suitable physical print media substrate for images, whether precut or web fed. The imaging device may include a variety of other components, such as finishers, paper feeders, and the like, and may be embodied as a copier, printer, or a multifunction machine. A "print job" or "document" is normally a set of related sheets, usually one or more collated copy sets copied from a set of original print job sheets or electronic document page images, from a particular user, or otherwise related. An image generally may include information in electronic form which is to be rendered on the print media by the marking engine and may include text, graphics, pictures, and the like. As used herein, the process direction is the direction in which an image receiving surface, e.g., media sheet or web, or intermediate transfer drum or belt, onto which the image is transferred moves through the imaging device. The cross-process direction, along the same plane as the image receiving surface, is substantially perpendicular to the process direction.

FIG. 1 is a simplified elevational view of a direct-to-media, continuous feed, phase-change ink printer 8. A web supply and handling system is configured to supply a very long (i.e., substantially continuous) web W of "substrate" (paper, plastic, or other printable material) from a spool 10. The web W may be unwound as needed, and propelled by a variety of motors, not shown. The web supply and handling system is capable of transporting the web W at a plurality of different speeds. A set of rolls 12 controls the tension of the unwinding web as the web moves through a path.

Along the path there is provided preheater 18 configured to bring the web to a target preheating temperature for printing, which in one practical embodiment, depending on the media type and ink formulation, is in a range of about 30° C. to about 70° C. The preheater 18 can rely on contact, radiant, conductive, or convective heat to bring the web W to the target preheat temperature.

After the preheater 18, the web W moves through a print zone 20 including a series of printheads 21A-21H, each printhead effectively extending across the width of the web and being able to place ink of one primary color directly (i.e., without use of an intermediate or offset member) onto the moving web. Eight printheads are shown in FIG. 1 although more or fewer printheads may be used. As is generally familiar, each of the four primary-color images placed on overlapping areas on the web W combine to form color images, based on the image data sent to each printhead through image path 22 from print controller 14. In various possible embodiments, there may be provided multiple printheads for each primary color; the printheads can each be formed into a single linear array. The function of each color printhead can be divided among multiple distinct printheads located at different locations along the process direction; or the printheads or portions thereof can be mounted movably in a direction transverse to the process direction P, such as for spot-color applications.

Operation and control of the various subsystems, components and functions of the machine or printer 10 are performed with the aid of a controller 14. The controller 14 may be a self-contained, dedicated mini-computer having a central processor unit (CPU), electronic storage, and a display or user interface (UI) (not shown). The controller 14 receives and manages image data flow between image input sources (not shown), which may be a scanning system or an online or a work station connection, and the printheads. The controller generates control signals that are delivered to the components and subsystems. These control signals, for example, include drive signals for actuating the ink jets of the printheads to eject drops in timed registration with each other and with the movement of the web W to form images thereon.

In one embodiment, the marking media applied to the web is a "phase-change ink," by which is meant that the ink is substantially solid or gelatinous at room temperature and substantially liquid when heated and initially jetted onto the web 14. Currently-common phase-change inks are typically heated to about 100° C. to 140° C., and thus in liquid phase, upon being jetted onto the web W. Generally speaking, the liquid ink cools down quickly upon hitting the web W.

Each printhead may have a backing member 24A-24H, typically in the form of a bar or roll, which is arranged substantially opposite the printhead on the other side of web W. Each backing member is used to position the web W so that the gap between the printhead and the sheet stays at a known, constant distance. Each backing member can be controlled to cause the adjacent portion of the web to reach a predetermined "ink-receiving" temperature, in one practical embodiment, of about 40° C. to about 60° C. In various possible embodiments, each backing member can include heating elements, cavities for the flow of liquids therethrough, etc.; alternatively, the "member" can be in the form of a flow of air or other gas against or near a portion of the web W. The combined actions of preheater 18 plus backing members 24 held to a particular target temperature effectively maintains the web W in the printing zone 20 in a predetermined temperature range of about 40° C. to 70° C.

As the partially-imaged web moves to receive inks of various colors throughout the printing station 20, the temperature of the web is maintained within a given range. Ink is jetted at a temperature typically significantly higher than the receiving web's temperature which heats the surrounding paper (or whatever substance the web W is made of). Therefore the members in contact with or near the web in zone 20 must be adjusted so that that the desired web temperature is maintained. For example, although the backing members may have an effect on the web temperature, the air temperature and air flow rate behind and in front of the web may also impact the web temperature. Accordingly, air blowers or fans may be utilized to facilitate control of the web temperature.

The web temperature is kept substantially uniform for the jetting of all inks from printheads in the printing zone 20. This uniformity is valuable for maintaining image quality, and particularly valuable for maintaining constant ink lateral spread (i.e., across the width of web W, such as perpendicular to process direction P) and constant ink penetration of the web. Depending on the thermal properties of the particular inks and the web, this web temperature uniformity may be achieved by preheating the web and using uncontrolled backer members, and/or by controlling the different backer members 24A-24H to different temperatures to keep the substrate temperature substantially constant throughout the printing station. Temperature sensors (not shown) associated with the web W may be used with a control system to achieve this purpose, as well as systems for measuring or inferring (from the image data, for example) how much ink of a given primary color from a printhead is being applied to the web W at a given time. The various backer members can be controlled individually, using input data from the printhead adjacent thereto, as well as from other printheads in the printing station.

Following the print zone 20, along the path of web W, is a "spreader" 40, that applies a predetermined pressure, and in some implementations, heat, to the web W. The function of the spreader 40 is to take what are essentially isolated droplets of ink on web W and smear them out to make a continuous layer by pressure, and, in one embodiment, heat, so that spaces between adjacent drops are filled and image solids become uniform. In addition to spreading the ink, the spreader 40 may also improve image permanence by increasing ink layer cohesion and/or increasing the ink-web adhesion. The spreader 40 includes rolls, such as image-side roll 42 and pressure roll 44, that apply heat and pressure to the web W. Either roll can include heat elements 46 to bring the web W to a temperature in a range from about 35° C. to about 80° C. In embodiments of the imaging device that utilize UV curable inks, the spreader may be replaced with one or more UV curing lamps, as are known in the art, that direct ultraviolet light onto the UV curable ink that forms the images on the web.

For optimum spreader performance, ink and web temperatures should be substantially uniform prior to entering the spreading nip 55 and be at a target temperature or within a target temperature range that promotes adherence of the melted ink to the web, minimizes "show through" of the ink through the web, and maximizes ink dot spread. The target temperature and the target temperature range for the ink and web temperatures prior to entering the spreading nip 55 may also be referred to as the spreading temperature or spreading temperature range (explained below). In addition, the process of bringing the ink and web temperatures to the spreading temperature or spreading temperature range may also be referred to as equalization of the ink and web temperatures. In one embodiment, the spreading temperature may be any temperature between approximately 30° C. and approximately 80° C., and, in one particular embodiment, is approximately 55° C. The spreading temperature or temperature range, however, may be any suitable temperature or range of temperatures depending on a number of factors such as the ink formulation, web substrate material, web velocity, and the like.

In order to equalize the ink and web temperatures at the target spreading temperature, a temperature leveling roller 50 and/or one or more midheaters 30 are positioned along the media path following the print station 20 to equalize the web and ink temperatures and to bring the web and ink temperatures to a target temperature for spreading prior to being fed through the spreading nip. The leveler roller 50 is a temperature controlled, thermally conductive roller designed to operate at a target temperature to equalize the incoming ink and web temperatures. The leveler roller may be formed of a thermally conductive material, such as aluminum, although the core may be made of other suitable materials, such as iron, nickel, stainless steel, and various synthetic resins. The development of thermal energy in the leveler roller 50 may be accomplished in any suitable manner. For example, the leveling roller may include heating and/or cooling elements (not shown) for maintaining the surface of the leveler roller at the desired operating temperature.

During operation, as the web is moved along the web path, the web W is wrapped partially around the leveler roller 50 as seen in FIG. 1. The length of the web that contacts the leveler roller is referred to herein as the wrap length, or contact length. Contact between the higher ink and web temperature with the lower temperature of the leveler roller causes conductive heat transference to occur between the web and the leveler roller thereby bringing the temperatures of the ink and web toward the operating temperature of the leveler roller 50. The extent to which the ink and web temperatures may be equalized, or leveled, is generally a function of the temperature of the leveler roller, and the length of time, or dwell time, that the web W remains in contact with the leveler roller. As used herein, dwell time refers to the maximum amount of time that any given point on the web remains in contact with the leveler roller. Dwell time between the web and the leveler roller is dependent upon the speed that the web is moving and the wrap length, or contact length, between the web and the leveler roller. The wrap length at which the web is in contact with the web may be any suitable wrap length that is capable of creating adequate dwell time to level the ink and web temperatures in light of the web speed and operating temperature of the leveler roller.

One or more midheaters 30 are positioned along the media path downstream from the leveler roller, i.e., after the leveler roller 50 in the process direction of the media, to heat the equalized ink and web temperatures to a target temperature for spreading. Midheaters 30 can use contact, radiant, conductive, and/or convective heat to bring the media W to a target temperature. The midheaters 30 bring the ink placed on the media to a temperature suitable for desired properties when the ink on the media is sent through the spreading nip. In one embodiment, a useful range for a target temperature for ink entering the spreading nip is about 35° C. to about 80° C., and in one particular embodiment is approximately 55° C.

As mentioned, one difficulty faced in using a leveler roller 50 to equalize ink and web temperatures before spreading is ink offset to the leveler roller. In previously known systems, the problems posed by ink offsetting to the surface of the leveler roller resulted in the leveler roller being operated at a temperature lower than would otherwise be required. The lower operating temperature in turn increased the amount of energy required to maintain the leveler roller at the desired operating temperature and increased the amount of energy required to reheat the ink and web to the target spreading temperature.

Figure 2:
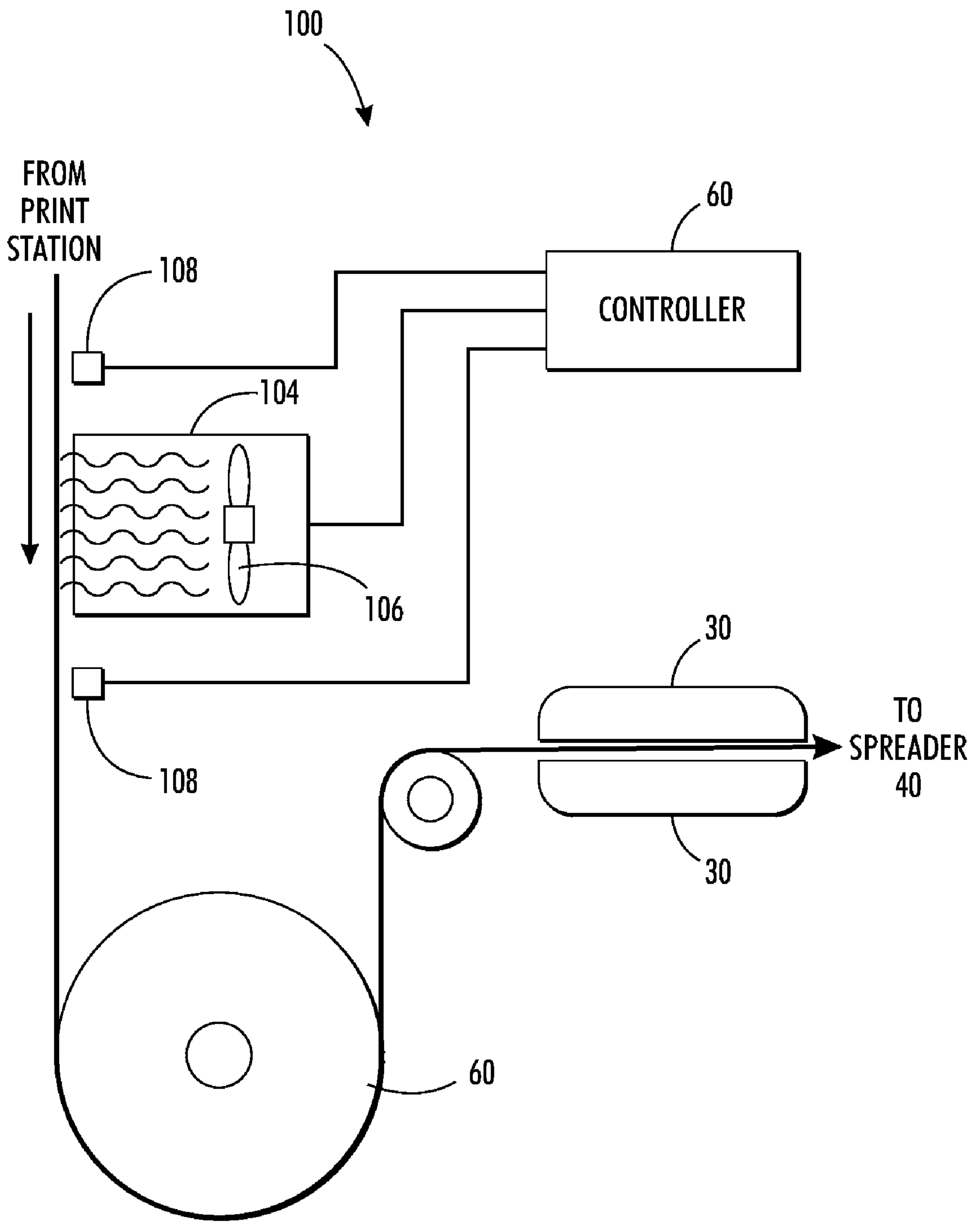
FIG. 2 is a schematic view of an embodiment of a three-stage leveling system for use with the imaging device of FIG. 1.

In order to avoid lowering the operating temperature of the leveling roller 50 and the problems associated therewith, a three-stage leveling system 100 has been developed that enables the leveling roller 50 to be operated at temperature closer to the spreading temperature which in turn decreases the amount of energy required to maintain the leveler roller at the desired operating temperature and decreases the amount of energy required to reheat the ink and web to the target spreading temperature. As depicted in FIGS. 1 and 2, such a three-stage leveling system 100 is enabled by the addition of a non-contact cooling device 104, also referred to as a pre-leveler cooling device 104, positioned along the web path between the print station 20 and the leveler roller 50. As used herein, "non-contact" with reference to cooling or heating devices refers to devices that are configured to remove or add thermal energy without touching or contacting the ink on the web in a manner that negatively impacts the image quality of images produced by the ink. The pre-leveler cooling device 104 is configured to cool the ink after the web exits the print station and prior to reaching the leveler roller 50. As used herein, the term "cooling" with respect to the ink refers the removal of thermal energy from the ink to decrease the temperature thereof. The decreased temperature of the incoming ink enables the leveler roller 50 to be operated at a higher temperature while still avoiding ink offset to the leveler roller surface. While the pre-leveler cooling device 104 may consume energy to remove heat from the ink, the overall energy expenditure for the imaging device is decreased due to the decrease in the amount of energy required to operate the leveler roller 50 and the midheaters 30.

The pre-leveler cooling device 104 may be operably coupled to the print controller 14 for controlling the output of the cooling device 104. The method of control depends on the method of cooling. For example, when using a blower or fan 106 for air cooling the web W such as depicted in FIG. 2, the output may be controlled by controlling blower or fan speed. The controller 14 may control the output of the cooling device 104 based, at least in part, on the measured temperature of the media web W. To that end, the system 100 may include one or more temperature sensors 108 as are known in the art for measuring the temperature of the moving web W at one or more locations, e.g., prior to and after cooling by the cooling device 104. Temperature sensors 108 may comprise non-contact type sensors such as thermopile or similar IR sensor. The controller 14 is operable to control power to the cooling device 104 based on the signals received from the temperature sensors 108 in order to reduce the temperature of the ink/web to the desired temperature.

The cooling device 104 is configured to reduce the temperature of the ink on the web W by a predetermined amount that enables the leveler roller 50 to be operated at a higher temperature relative to previously known systems while still avoiding ink offset to the leveler roller. In one embodiment, the cooling device 104 is configured to remove thermal energy from the ink on the web W to reduce the ink temperature by approximately 10-20% depending on such factors as the temperature of the ink, amount or thickness of ink on the web, web velocity, media type, and the like. In one particular implementation of the imaging device, with the average ink temperature leaving the print station being approximately 75° C., the cooling device is configured to reduce the temperature of the ink by approximately 13% for about a 10° C. reduction in temperature so that the incoming ink to the leveler roller 50 is at approximately 65° C.

The reduction in incoming ink temperature of 10-20% increases the ink offset latitude of the leveler roller which enables the leveler roller to be operated at a higher temperature relative to previously known systems while still avoiding ink offset. For example, with incoming ink average temperature being approximately 75° C., the leveler roller of previously known systems needed to be operated at approximately 35° C. to avoid ink offset. Using the pre-leveler cooling device 104 to decrease the temperature by about 10° C. enables the leveler roller 50 to be operated at an increased temperature, e.g., approximately 45° C., relative to the previously known systems. Of course, any suitable operating temperature for the leveler roller 50 may be utilized. In addition, because the cooling device 104 enables the leveler roller 50 to be operated at a temperature closer to the spreading temperature, e.g., approximately 55° C., than in previously known systems, less energy is required by the midheaters 30 to heat the equalized ink and web temperatures to the spreading temperature for spreading.

Figure 3:
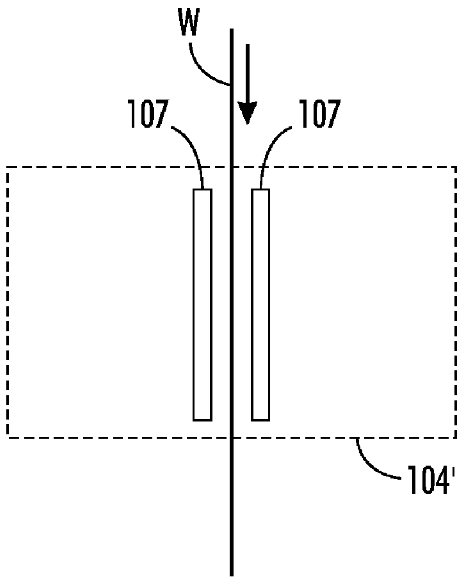
FIG. 3 shows an alternative embodiment of the non-contact cooling device of the leveling system of FIG. 2.
Figure 4:
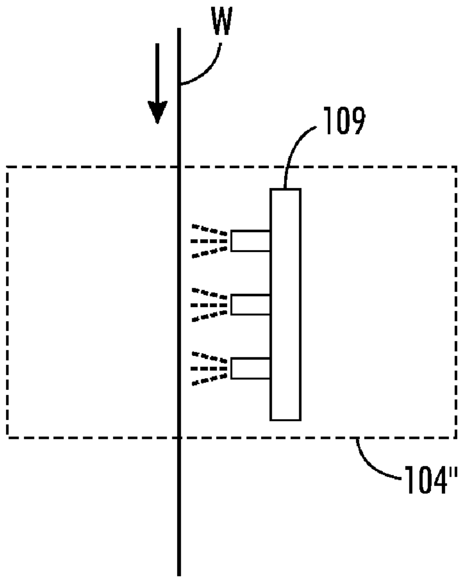
FIG. 4 shows another alternative embodiment of the non-contact cooling device of the leveling system of FIG. 2.

The pre-leveler cooling device 104 may remove thermal energy from the ink on the web in any suitable manner without disturbing the image quality of the images formed by the ink. For example, as mentioned, the cooling device 104 of FIG. 2 includes a blower or fan 106 configured to direct thermally controlled medium, such as air, onto the web. FIGS. 3 and 4 show other embodiments of non-contact cooling devices suitable for removing thermal energy from the ink on the web. For example, in FIG. 3, the cooling device 104' comprises chilled plates 107 arranged adjacent the web path to cool the ink on the web. Although the chilled plates 107 of FIG. 3 are shown as comprising a single plate positioned on each side of the web path opposite from each other with the web W traveling therebetween, chilled plates may be arranged in any number of configurations along the web path to generate the desired cooling effect. For example, one or more chilled plates may be arranged on a single side of the web, or multiple plates may be arranged on each side of the web. FIG. 4 shows an embodiment of a cooling device 104" which comprises a fluid misting device 109 configured to direct or release a fine mist of fluid, such as water, alcohol, or other suitable type of fluid, in the vicinity of the ink on the web W to remove thermal energy via evaporative cooling.

It will be appreciated that various embodiments of the above-disclosed and other features and functions, or alternatives thereof, may be desirably combined into many other different systems, applications or methods. Various presently unforeseen or unanticipated alternatives, modifications, variations or improvements therein may be subsequently made by those skilled in the art which are also intended to be encompassed by the following claims.

What is claimed is:

1. An imaging device comprising:

a media transport system configured to transport print media along a media path;

at least one printhead associated with the media path to deposit ink onto the print media, the deposited ink having a first average temperature;

a non-contact cooling device positioned adjacent the media path to reduce the temperatures of the ink deposited onto the print media by the at least one printhead to a second average temperature that is less than the first average temperature;

a leveler including a thermal control for maintaining the leveler at a third temperature that is different than the second average temperature, the leveler being configured to bring the temperatures of the ink to within a predetermined range about the third temperature;

a heater for heating the ink and media to a fourth temperature after the leveler, the fourth temperature being greater than the third temperature; and a spreader for spreading the deposited ink on the print media after being heated to the fourth temperature by the heater.

2. The imaging device of claim 1, the non-contact cooling device being configured to direct air towards the print media.

3. The imaging device of claim 1, the non-contact cooling device comprising at least one chilled plate arranged adjacent the print media.

4. The imaging device of claim 1, the non-contact cooling device comprising a fluid misting device configured to direct a fine mist of fluid toward the print media.

5. The imaging device of claim 4, the non-contact cooling device being configured to reduce the temperature of the ink by approximately 10° C.

6. The imaging device of claim 1, the ink comprising melted phase change ink.

7. The imaging device of claim 1, the non-contact cooling device being configured to reduce the temperature of the ink by approximately 10% to approximately 20%.

8. A temperature leveling system for thermally conditioning ink deposited onto a print media prior to the ink being fixed to the print media, the leveling system including:

a non-contact cooling device for reducing temperatures of ink deposited onto a print media to a first average temperature;

a leveler including a thermal control for maintaining the leveler at a second temperature that is different than the first average temperature, the leveler being configured to bring the temperatures of the ink to within a predetermined range about the second temperature; and a heater for heating the ink and media to a third temperature after the leveler, the third temperature being greater than the second temperature.

9. The leveling system of claim 8, the non-contact cooling device being configured to direct air toward the print media.

10. The leveling system of claim 8, the non-contact cooling device comprising at least one chilled plate arranged adjacent the print media.

11. The leveling system of claim 8, the non-contact cooling device comprising a fluid misting device configured to direct a fine mist of fluid toward the print media.

12. The leveling system of claim 8, the non-contact cooling device being configured to reduce the temperatures of the ink by approximately 10% to approximately 20%.

13. The leveling system of claim 12, the non-contact cooling device being configured to reduce the temperature of the ink by approximately 10° C.

14. A method of operating an imaging device comprising:

transporting a print media along a media path;

depositing ink onto the print media as it is being transported, the ink deposited onto the print media having a first average temperature;

reducing the temperatures of the deposited ink to a second average temperature that is less than the first average temperature using a non-contact cooling device;

equalizing the deposited ink temperatures to within a predetermined range about a third temperature, the third temperature being different than the first and the second average temperatures after the reduction in temperature;

heating the deposited ink to a fourth temperature using a non-contact heater after equalization, the fourth temperature being greater than the third temperature; and spreading the deposited ink on the print media after being heated to the fourth temperature.

15. The method of claim 14, the non-contact cooling device being configured to direct air onto the print media.

16. The method of claim 14, the non-contact cooling comprising at least one chilled plate arranged adjacent the print media.

17. The method of claim 16, the second average temperature being approximately 10° C. less than the first average temperature.

18. The method of claim 14, the non-contact cooling device comprising a fluid misting device configured to direct a fine mist of fluid toward the print media.

19. The method of claim 14, the second average temperature being less than the first average temperature by approximately 10%-20%.

* * * * *